June 19, 1962     J. E. LANGE     3,039,552
FLUID DRIVE MEANS FOR VEHICLES

Filed Sept. 3, 1959     2 Sheets-Sheet 1

INVENTOR.
JOHN E. LANGE
BY
Gardner & Zimmerman
ATTORNEYS

June 19, 1962  J. E. LANGE  3,039,552
FLUID DRIVE MEANS FOR VEHICLES
Filed Sept. 3, 1959  2 Sheets-Sheet 2
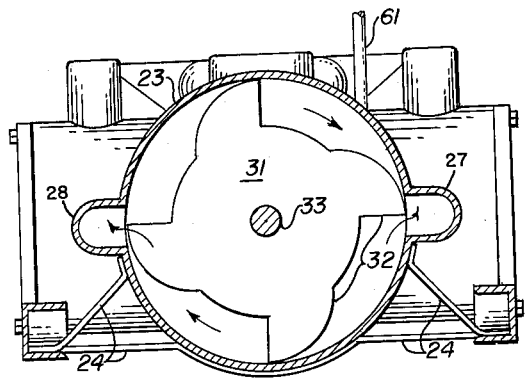
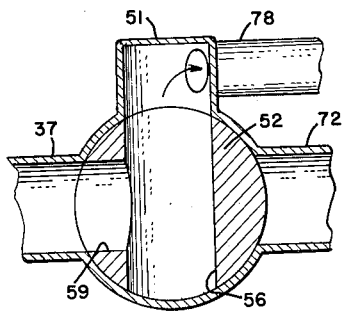
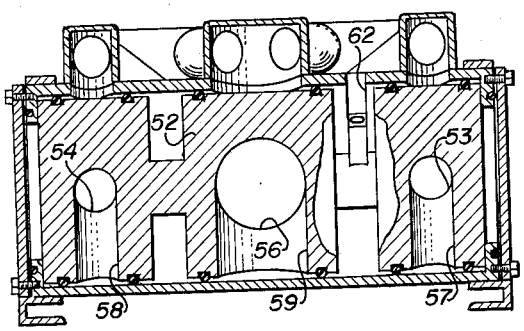
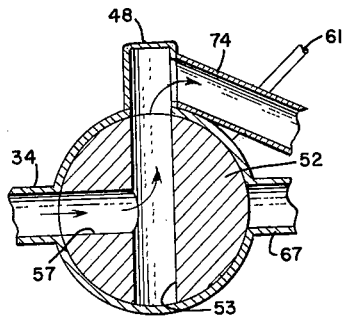
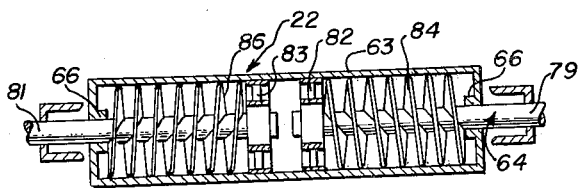
INVENTOR.
JOHN E. LANGE
BY
ATTORNEYS

United States Patent Office 3,039,552
Patented June 19, 1962

3,039,552
FLUID DRIVE MEANS FOR VEHICLES
John E. Lange, 460 28th St., Oakland, Calif.
Filed Sept. 3, 1959, Ser. No. 837,973
1 Claim. (Cl. 180—66)

The present invention relates generally to drive means for motor vehicles and the like, and is particularly directed to a fluid drive system for motor vehicles and the like whereby the usual transmission, drive shaft, differential, and other components of the conventional relatively complex drive system are eliminated.

The conventional geared mechanical drive system in present day motor vehicles is a constant source of difficulty. Not only do the components such as the transmission and differential require frequent special servicing, e.g., lubrication, but in addition by virtue of their large number of parts which are subjected to constant mechanical wear, the components are relatively short lived. In general, one or more of the basic components of a conventional mechanical drive system require replacement long before the life of the remainder of the motor vehicle has been surpassed. Advantages are therefore to be gained by the incorporation in a motor vehicle of a drive system wherein component parts and direct mechanical linkages are substantially eliminated.

Accordingly, it is an object of the present invention to provide a fluid drive system having a minimum of moving parts and direct mechanical linkages for coupling the engine in driving relation to the rear wheels of a motor vehicle or for accomplishing an equivalent drive coupling.

Another object of this invention is the provision of a drive system for motor vehicles and the like which facilitates the smooth acceleration of the vehicle from a stop to desired speed without the usual transmission gearing.

Yet another object of the present invention is to provide a drive system for motor vehicles and the like which facilitates a differential action of the driving wheels without the employment of differential gearing.

It is still another object of the invention to provide a motor vehicle drive means which requires a minimum of lubrication or other special servicing at relatively infrequent intervals.

Yet another object of the present invention is the provision of a fluid drive system wherein the air or other working fluid is continuously recirculated.

A further object of the present invention is to provide in a motor vehicle or the like an improved drive means which is extremely simple and economical in structure, durable and efficient, and substantially noiseless in use.

An even further object of the present invention is to provide motor vehicle drive means which may be readily shifted from the forward to reverse driving directions while the vehicle is in motion to provide a substantive breaking action.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

FIGURE 4 is a sectional view taken along the line 4—4 of FIGURE 1 and illustrating particularly the compressor of the drive system.

FIGURE 5 is a sectional view taken along the line 5—5 of FIGURE 1 and illustrating further the control valve.

FIGURE 6 is a sectional view along the line 6—6 of FIGURE 1 and illustrating the fluid driven axles of the drive system.

FIGURE 7 is fragmentary sectional view of the control valve similar to FIGURE 2 but illustrating the valve in reverse drive position.

FIGURE 8 is a fragmentary sectional view of the control valve similar to FIGURE 3 but illustrating the valve in reverse drive position.

Figure 1:
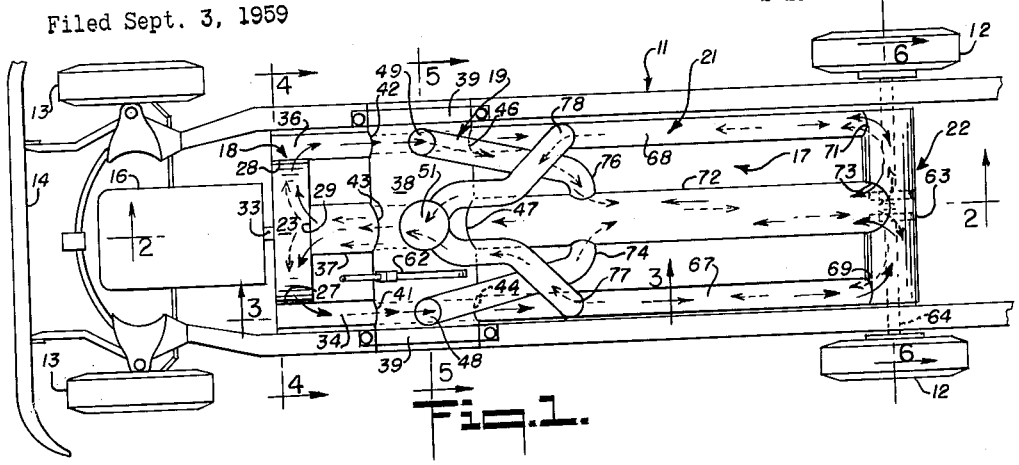
FIGURE 1 is a plan view of the chassis of a motor vehicle embodying the fluid drive system of the present invention.

Considering now the invention in some detail and referring to the illustrated form thereof in the drawings, FIGURE 1 in particular, there is seen to be provided a conventional motor vehicle chassis 11 including rear wheels 12, front wheels 13, bumpers 14, and motor 16. It is particularly important to note that in place of the usual geared driving system including transmission, drive shaft, differential, universal, and the like, a simple economical fluid drive system 17 in accordance with the present invention is carried by chassis 11 to couple the motor 16 in driving relative to the rear wheels 12.

The term fluid drive system as herein applied to the present invention is to be taken as descriptive of both a hydraulic as well as a pneumatic system. The principles of the invention as detailed hereinafter are consequently to be taken as applicable to a hydraulic system in addition to the pneumatic system illustrated and described in detail herein, the only substantive difference being in the working fluid employed and components specifically adapted to use therewith.

As regards the physical details of the pneumatic fluid drive system 17, of the preferred embodiment, it is to be noted that it generally comprises a compressor 18 which is driven by the motor 16 to compress entering air and serves as the source of pressurized operating fluid for the system. The compressor 18 forces the air through a control valve 19 which in turn is coupled via a unique flow path system 21 to pneumatic fluid rotary drive means 22 connected to the rear wheels 12. The flow path system 21 in addition provides for the recirculation of the air from the rotary drive means 22 subsequent to driving the wheels 12, such air being returned through the control valve 19 to the compressor 18. By virtue of the air recirculation, air is conserved and the fluid drive system 17 operates at optimumly high efficiency. The control valve 19 facilitates the selective reversal of the direction of fluid flow through the flow path system whereby the direction of drive of the rear wheels 12 may be readily changed as desired.

Although any compressor 18 may be satisfactorily employed as a source of pressurized fluid in the drive system 17, I have found a central intake rotary centrifugal compressor to be preferable. More particularly, compressor 18 preferably includes a closed cylindrical housing 23 which is mounted coaxially of chassis 11 at a forward position of same just rearwardly of motor 16. The housing 23 is secured in the foregoing position as by means of rigid support members 24 attached between the chassis and housing. The housing 23 is provided with a central inlet port 26 in its front face. In addition a pair of outlet ports 27 and 28 are provided at diametrically opposed side positions of the peripheral wall of the housing whereas an inlet port 29 is provided centrally of the rear face of same.

Within the housing 23 is journalled an impeller 31 the vanes 32 of which are in close engagement with the inner walls of the housing (see FIGURE 4). A drive shaft 33 is centrally secured to the impeller 31 and extends coaxially through inlet port 26 into connection with motor 16. Hence upon starting and acceleration of the motor 16 in the conventional manner by an operator of the motor vehicle, the impeller 31 is rotated at a proportional speed. Air entering the compressor via the inlet ports 26 and 29 is hence centrifugally forced through outlet ports 27 and 28 with a force or pressure determined by the rotational velocity of the impeller 31.

In order to couple the compressor 18 to the control valve 19 a pair of outlet conduits 34 and 36 are communicably connected in air tight relation to outlet ports 27 and 28 and extend longitudinally rearward to the valve. In addition, a return conduit 37 having twice the diameter of conduits 34 and 36 is communicably connected to inlet port 29 in pressure sealed relation thereto and extends axially rearward to the valve.

As mentoined previously, the control valve 19 controls the direction of air flow to the pneumatic fluid rotary drive means 22 through flow path system 21. To this end the valve 19 preferably includes a closed cylindrical valve housing 38 mounted transversely of the chassis 11 in rearwardly spaced relation to the compressor 18. The housing is mounted as by means of a pair of straps 39 rigidly secured to the respective side members of the chassis. The valve housing is provided with a pair of longitudinally extending inlet ports 41 and 42 spaced transversely on opposite sides of an axially extending return port 43 in the forward portion of the housing. The output conduits 34 and 36 from the compressor 18 are respectively attached in pressure sealed relation to the inlet ports 41 and 42 of the valve housing 38. The return conduit 37 to the compressor is similarly connected to the return port 43 of the valve housing. Ports 41, 42, and 43 are conformed in cross sectional area to conduits 34, 36, and 37 connected thereto.

Figure 2:
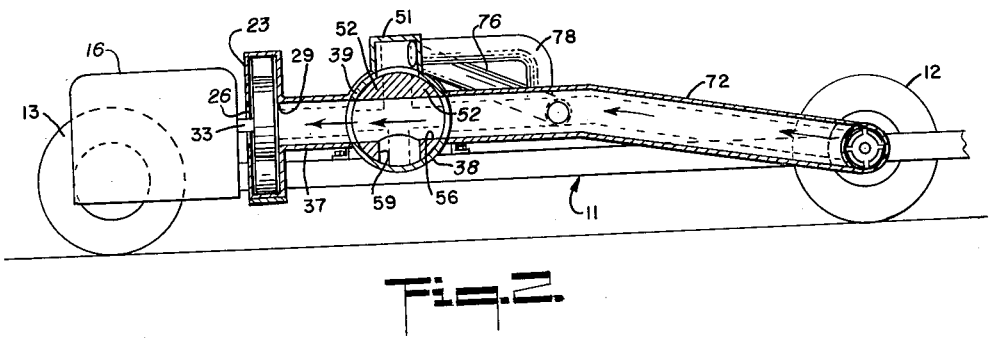
FIGURE 2 is a sectional view taken along line 2—2 of FIGURE 1.
Figure 3:
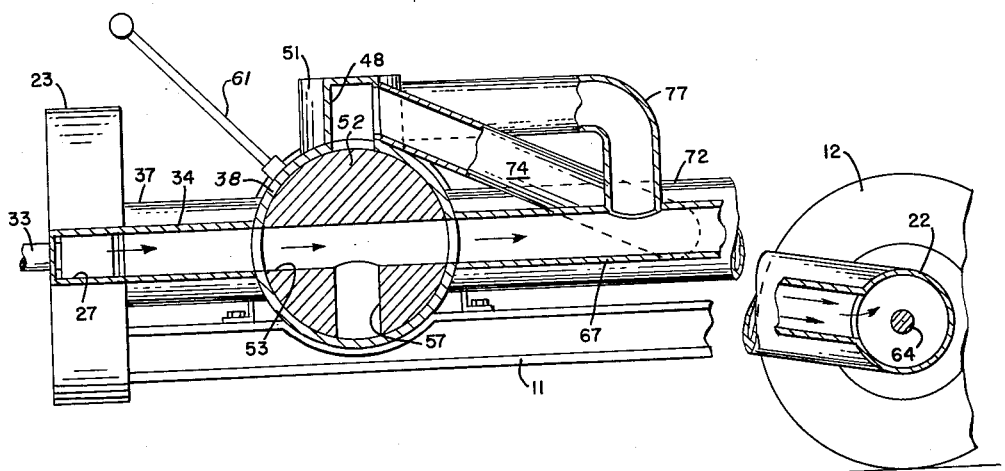
FIGURE 3 is a sectional view taken along the line 3—3 of FIGURE 1 and illustrating particularly the control valve of the drive system.

The compressed air delivered to the inlet ports 41 and 42 of the valve housing and returned to the compressor via return port 43 may be selectively controlled relative to a plurality of other conformed outlet and inlet ports provided in the valve housing. More specifically, outlet ports 44 and 46 are provided in the rear portion of the valve housing 38 in diametric opposition to inlet ports 41 and 42 respectively (see FIGURE 1). An inlet port 47 is similarly provided diametrically opposite return port 43. A third set of outlet ports 48 and 49 spaced transversely on opposite sides of an inlet port 51 are provided in the valve housing at a position displaced 90 degrees from the second set of ports 44, 46, and 47, preferably in the upper portion of the valve housing. To the end of providing selective communication between the first set of ports 41, 42 and 43 and either the second set of ports 44, 46, and 47, or the third set of ports 48, 49, and 51, an appropriately bored cylindrical valve body 52 is rotatably mounted coaxially within valve housing 38. The body 52 is provided with diametrically extending bores 53, 54, and 56 (see FIGURE 5) which may be placed in simultaneous registry with ports 41 and 44, 42 and 46, and 43 and 47 respectively upon appropriate rotation of the body. Radial bores 57, 58, and 59 are likewise provided in the valve body 52 in right angular communication with the centers of bores 53, 54, and 56 respectively. These latter bores, 57, 58, and 59 are placed in registry with the first set of ports 41, 42, and 43 while the bores 53, 54, and 56 are simultaneously placed in registry with the third set of ports 48, 49, and 51 upon rotation of the body 90 degrees from the position noted hereinbefore. The valve body hence facilitates communication between the first and second sets of ports through bores 53, 54, and 56 when in the position depicted in FIGURES 2 and 3. Communication between the first and third sets of ports through bores 57, 58, and 59 and halves of bores 53, 54, and 56 is effected with the body rotated 90 degrees to the position depicted in FIGURES 7 and 8. To facilitate ready rotation of the valve body between the foregoing positions a radially extending lever 61 is rigidly secured thereto (see FIGURE 3) and projects through a circumferential slit 62 in the valve housing as best shown in FIGURE 1. The slit 62 extends through 90 degrees of arc such that with lever 61 at the two extremes of the slit, the valve body is in the two rotational positions of previous mention. The lever 61 moreover is disposed to be readily accessible to an operator of the motor vehicle and serves substantially the same function in the present invention in a manner detailed hereinafter as the usual forward and reverse selecting gear shift lever in a conventional drive system.

Considering now the unique flow path system 21 in particular detail and the manner in which same coacts with the valve 19 to provide readily controllable flow of compressed air or other working fluid to the rotary drive means 22, it is to be noted that the flow path system includes as a principal element a fluid torque tube 63. This tube is disposed transversely of the chassis coaxially about the rear axle 64 connected to the rear wheels 12. The tube 63 is substantially air tight, appropriate rotation permitting pressure seals 66 being provided in its ends for traversal by the axle as best shown in FIGURE 6. The tube also houses the rotary drive means 22.

To connect the torque tube 63 to the valve 19, flow path system 21 further includes a pair of parallel rearwardly extending pressure conduits 67, and 68 secured in pressure sealed relation to outlet ports 44, and 46 of the second set of ports provided in the housing of valve 19. Conduits 67 and 68 communicate at their other ends with the interior of tube 63 through radial ports 69 and 71 provided at the opposite ends thereof. Air tight connections are provided between the conduits and tube. A third pressure conduit 72 having a diameter twice that of the conduits 67 and 68 and equal that of tube 63 is similarly communicably connected in air tight relation between return port 47 and a central radial port 73 provided in the torque tube 63. Conduits 67, 68, and 72 are additionally of the same cross sectional area as conduits 34, 36, and 37 respectively. Hence, with the valve 19 set to couple the first and second sets of ports thereof, compressed air from the compressor 18 as supplied through conduits 34 and 36 is directed rearwardly through conduits 67 and 68 to the opposite ends of torque tube 63. The entering air is directed from the ends to the center of the tube 63 to then pass forwardly through the common path provided by conduit 72. The air is then returned through valve 19 and return conduit 37 to the compressor 18 for recirculation through the path just described, which path is depicted by the solid arrows of FIGURE 1. Additional air as required may enter the compressor through the central inlet port 26 thereof for delivery to the flow system. The amount of additional air required, however, is relatively low due to the recirculation of the air in the system. Inasmuch as air is in effect conserved, the efficiency of compressor 18 is high. Moreover, by virtue of the equal cross sectional areas of the various comparable conduits and the 2 to 1 ratio in the areas of the conduits where appropriate pressure throughout the flow system is uniform.

In order that the direction of air flow through the flow path system 21 may be reversed upon operation of control valve 19 in the manner previously described, the flow path system 21 further includes appropriately connected reversing pipes. More particularly, a pair of elbow conduits 74 and 76 or the like are respectively communicably connected in air tight relation between ports 48, and 49 of the third set thereof provided in valve housing 38 and the conduit 72. The diameters of conduits 74, and 76 are each substantially half that of conduit 72 and are connected to the latter conduit in diametric opposition at a point rearwardly of the valve 19. Another pair of elbow conduits 77 and 78 are communicably connected in air tight relation between port 51 and respectively conduits 67 and 68. The conduits 77 and 78 are of the same diameter as the conduits 67 and 68 and connect thereto at points respectively equally spaced rearwardly from the control valve. With the control valve set to interconnect the first set of ports 41, 42, and 43 with the third set of ports 48, 49, and 51 the flow of air through the flow path system 21 is hence reversed as depicted by the dashed arrows in FIGURE 1. More particularly, compressed air supplied to conduits 34 and 36 from the compressor 18 passes through the control valve 19 to the reversing conduits 74 and 76. From these conduits the air is directed rearwardly through conduit 72 to the medial region of torque tube 63. The air passes outwardly in both directions from the center to the end of tube 63 to thereat enter conduits 67 and 68. The air flows forwardly through these latter conduits and then through conduits 77 and 78 to the port 51 of the control valve 19. Thereafter the air is directed through return conduit 37 to the compressor 18 for recirculation through the system.

Considering now preferred structure for the rotary drive means 22 which serve to drive the rear wheels 12 in selectable forward moving or rearward moving directions according to the direction of air or other fluid flow through torque tube 63, it is to be noted that such structure is as illustrated in FIGURE 6. It is particularly important to note that the drive means in addition to applying driving rotation to the rear wheels must also facilitate a differential action therebetween, a conventional geared differential being not included in the drive system of the present invention. To this end, rear axle 64 is split to include individual portions 79 and 81, opposite ends of which carry the respective rear wheels 12. The confronting ends of the axle portions 79 and 81 are journalled in bearings 82 and 83 which are mounted in a medial portion of the torque tube 63 and well within the compass of port 73 such that passage of air or other working fluid therethrough is not blocked. The rear wheels 12 are thus independently rotatable by virtue of the split axle arrangement.

The drive means further includes means rigidly secured to the axle portions 79 and 81 to effect forward and rearward rotation of same, and therefore the rear wheels 12, in response to the two respective directions of flow of compressed air or other fluid through the torque tube 63. Various impellers or equivalent means known in the art may be employed to accomplish the foregoing. However, helically vaned impellers 84 and 86 resembling screw threads in appearance and rigidly concentrically secured to axle portions 79 and 81 are preferably employed to facilitate the fluid actuated rotation of same. The peripheral edge surfaces of the helical vanes are in close fitting relative to the inner wall of tube 63. Hence compressed air entering the tube is forced to traverse helical paths in the spaces defined by adjacent vanes of the impellers 84 and 86. In flowing helically past the vane surfaces in transit to an exit from the tube 63, the energy of the compressed air or other fluid is transmitted with high efficiency to the impellers. Such energy is expended in effecting rotation of the axle portions 79 and 81 and therefore the rear wheels 12. Moreover, the direction of rotation is dependent upon the direction of fluid flow through the helical paths defined by the vanes. In the illustrated embodiment, the impeller vanes are pitched to effect forward moving rotation in response to flow of fluid from the ends towards the center of torque tube 63 and reverse moving rotation in response to fluid flow from the center towards the ends of same. It is further important to note that inasmuch as each axle portion 79 and 81 is driven individually, a differential action between the rear wheels 12 is facilitated.

In operation, the control lever 61 is first placed in a medial position relative to the ends of slot 62. With the lever in such position the valve body 52 is disposed relative to the valve housing 38 such that bores 53, 54, and 56 and 57, 58, and 59 do not register with the various sets of ports in the housing. Passage through the valve 19 is thus blocked. The motor 16 may then be started, such motor driving the compressor 18 which in turn applies compressed air to outlet conduits 34 and 36. Inasmuch as passage of air through control valve 19 is blocked, the compressed air is not applied to the rear wheel driving impellers 84 and 86 through flow path system 21. The motor vehicle is hence retained in a stationary position.

To drive the vehicle in either the forward or reverse direction, the control lever 61 is displaced to the forward or rearward extremes respectively of slot 62. With lever 61 at the forward extreme of the slot 62, for example, the bores 53, 54 and 56 of the control valve connect outlet conduits 34 and 36 and return conduit 37 to conduits 67, 68, and 72 respectively of flow path system 21. Compressed air from compressor 18 is thus applied through the system 21 to the impellers 84 and 86 disposed within torque tube 63. The direction of flow through the tube 63 is from its ends to the center thereof wherefrom the air is returned to the compressor for recirculation as described in detail hereinbefore. This direction of air flow is such as to drive the impellers 84 and 86 and rear wheels 12 respectively coupled thereto in a forward moving direction. With the engine 16 at an idle, however, the amount of air applied from the compressor to the drive system is not sufficient to overcome inertial effects at the wheels of the vehicle. Thus the drive system of the present invention advantageously facilitates retention of the vehicle in a stationary position with the system in drive position as is desirable at a stop for example. Upon throttling the motor 16, the flow of air from compressor 18 is increased in proportion to the shaft speed thereof. The increased air hence turns the impellers 84 and 86 to drive the vehicle forward. The vehicle, moreover, is driven at a speed determined by the throttle setting of the motor 16, as is customary in conventional motor vehicles, due to the proportionate flow of air from the compressor. A vehicle employing the fluid drive system 17 of the present invention may thus be accelerated by depressing the motor foot throttle or the like in the usual manner.

With lever 61 urged to the rear extreme of slot 62, the bores 57, 58, and 59 and portions of bores 53, 54 and 56 connect the conduits 34, 36, and 37 to the reversing conduits 74, 76, and 77, 78 of flow path system 21. The direction of air flow through the system is thereby reversed and reverse moving rotation of wheels 12 effected in the manner previously described. Aside from the usual employment of reverse drive to effect reverse movement of the vehicle, reverse drive in accordance with the present invention may also be employed to brake the vehicle when travelling down hill. To effect the braking action, the lever 61 is shifted directly from the forward to the reverse position and the amount of braking regulated by throttling the motor 16.

What is claimed is:

In combination with a vehicle chassis a motor carried thereon, a pair of driving wheels, an air drive system comprising a torque tube mounted transversely of said chassis, a split axle concentrically journalled within said tube with the opposite ends of the axle portions projecting therefrom and respectively secured to said wheels, a pair of supply conduits extending longitudinally of said chassis and respectively communicably connected in pressure sealed relation to the opposite ends of said torque tube, a return conduit extending longitudinally of said chassis and communicably connected in air tight relation to the medial region of said torque tube, a rotary centrifugal air compressor mounted upon said chassis and having a housing with front and rear central intake ports and a pair of opposed peripheral outlet ports, said housing enclosing a vaned impeller journalled for rotation about the central longitudinal axis of the housing with the impeller vanes in close engagement with the housing walls, said impeller shaft being connected to said motor, a pair of vaned impellers respectively concentrically secured to said axle portions within said torque tube, a cylindrical valve housing carried transversely of said frame and having first and second sets of three transversely spaced ports in diametric opposition and a third set of three ports displaced 90 degrees from said first and second sets thereof, the outer ports of said first set communicably connected to the outlets of said compressor and the center port of said first set communicably connected to the intake of said compressor, the outer ports of said second set communicably connected to said supply conduits and the center port of the second set communicably connected to said return conduit, the outer ports of said third set communicably connected to said return conduit and the center port of said third set communicably connected to said supply conduits, a valve body disposed concentrically within said housing and rotatable therewith, said body having three transversely spaced diametric bores and three radial bores respectively right angularly intersecting the centers of said diametric bores, and means secured to said valve body for rotating same between a position wherein said diametric bores are in registry with said first and second sets of ports and a position wherein said radial bores are in registry with said first set of ports and said diametric bores are in registry with said third set of ports, whereby the direction of air flow through said torque may be selectively reversed.

References Cited in the file of this patent

UNITED STATES PATENTS

| | | |
|---|---|---|
| 513,057 | Poole | Jan. 16, 1894 |
| 961,372 | Rockwell | June 14, 1910 |
| 1,189,042 | Beijer | June 27, 1916 |
| 1,426,902 | Noel et al. | Aug. 22, 1922 |
| 1,987,698 | Montelius | Jan. 15, 1935 |
| 2,228,411 | Sheridan | Jan. 14, 1941 |
| 2,529,787 | Shepelrich | Nov. 14, 1950 |
| 2,626,001 | Antle | Jan. 20, 1953 |